April 13, 1943.  R. A. GOEPFRICH  2,316,414
BRAKE
Filed April 18, 1940
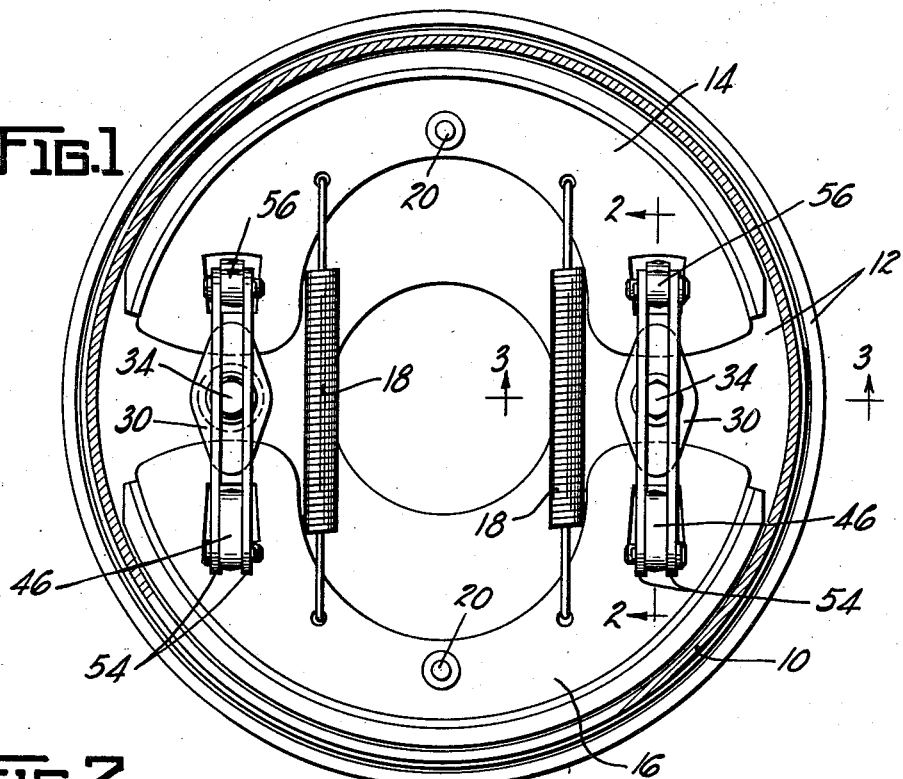
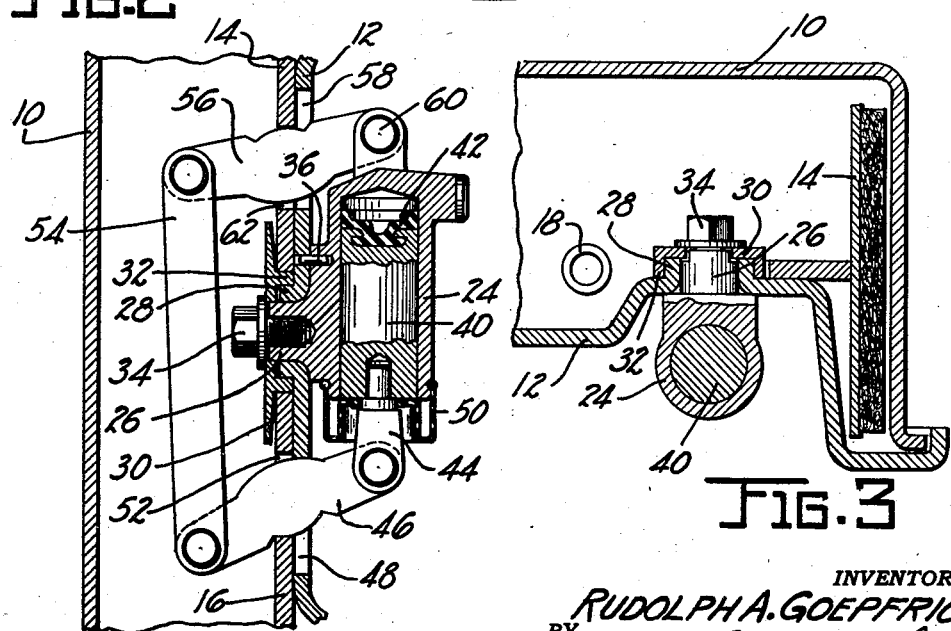
INVENTOR.
RUDOLPH A. GOEPFRICH
BY
ATTORNEY.

Patented Apr. 13, 1943

2,316,414

UNITED STATES PATENT OFFICE 2,316,414

BRAKE

Rudolph A. Goepfrich, South Bend, Ind., assignor to Bendix Aviation Corporation, South Bend, Ind., a corporation of Delaware Application April 18, 1940, Serial No. 330,237

8 Claims. (Cl. 188—152)

This invention relates to brakes, and is illustrated as embodied in an internal expanding brake for an automobile.

An object of the invention is to provide simple and effective means for applying balanced spreading forces to the shoes of a brake. Preferably this applying means includes an actuator mounted externally of the brake; this mounting is especially advantageous for the wheel cylinder of a hydraulic system, since it protects the cylinder from the effects of the heat generated in braking.

Another object is to provide a very effective brake having shoes which are individually shiftable to anchor at opposite ends in forward and reverse braking, and arranged to be operated by the above-described force-balancing applying means.

The above and other objects and features of the invention will be apparent from the following description of the illustrative embodiment shown in the accompanying drawing, in which:

Figure 1 is a section through the brake, just inside the head of the brake drum, with the shoes shown in side elevation; and Figures 2 and 3 are partial sections respectively on the lines 2—2 and 3—3 of Figure 1.

The brake illustrated includes a drum 10, at the open side of which is a support such as a backing plate 12, and within which are housed friction members such as a pair of shoes 14 and 16 connected by return springs 18 and provided with suitable steady rests 20. These shoes are arranged to shift individually to anchor at opposite ends in forward and reverse braking, so that both of them are always fully effective.

At the front and rear sides of the brake, opposite the shoe ends, novel actuators are mounted on the support 12, preferably externally of the brake. Each actuator, in the form illustrated, includes a wheel cylinder 24 seated against the exterior of the backing plate 12, and shown as formed with a boss 26 seated in a sleeve 28 drawn inwardly from the backing plate.

An anchor plate 30, engaged by the adjacent ends of the shoes, has a flange 32 embracing the sleeve 28, and is secured to the boss 26 by means such as a machine screw 34. A pin 36 prevents the cylinder 24 from turning. The shoes anchor on the flanges 32 of the two anchor plates 30, and the ends of the shoes are embraced between the anchor plates 30 and portions of the backing plate drawn inwardly from the plane of the plate as shown in Figure 2.

Each cylinder 24 is provided with a piston 40, faced with a suitable rubber sealing cup 42, provided with a yoke 44 pivoted to one end of a floating lever 46 arranged generally perpendicular to the backing plate and passing through a slot 48 in the backing plate. A boot 50 may if desired be provided to keep dirt out of the cylinder 24.

The central portion of lever 46 passes through a slot 52 in the end portion of the web of shoe 16, and is rounded for effective thrust engagement with the lower end of the slot. The inner end of the lever is connected, by means such as a pair of links 54, to the inner end of a lever 56 which passes through a slot 58 in the backing plate and is fulcrumed on a pivot 60 carried by the upper end of cylinder 24. The central portion of lever 56 passes through a slot 62 in the end portion of the web of shoe 14, and is rounded for effective thrust engagement with the upper end of the slot.

In operation, depression of the brake pedal (not shown) operates a master cylinder (not shown) to create hydraulic pressure in the cylinders 24, forcing the pistons 40 downwardly. This applies a force to each of the levers 46, which is balanced between a thrust directly effective on shoe 16 and a thrust transmitted through links 54 and lever 56 to the shoe 14.

While one illustrative embodiment has been described in detail, it is not my intention to limit my invention to that particular embodiment, or otherwise than by the terms of the appended claims.

I claim:

1. Actuating means for a brake having friction members mounted on a support comprising a pair of connected levers passing through the support and acting respectively on the friction members, and an actuator mounted on said support and operating said levers in which actuating means one lever is fulcrumed at one end and acts centrally on its friction member, and the other lever is operatively engaged at one end by said actuator and acts centrally on its friction member and has its other end connected to the free end of the first lever.

2. Actuating means for a brake having friction members mounted on a support comprising a pair of connected levers passing through the support and acting respectively on the friction members, and an actuator mounted on said support and operating said levers in which actuating means an anchorage for the friction means is formed by parts securing the actuator to the support.

3. Actuating means for a brake having friction members mounted on a support comprising a pair of connected levers passing through the support and acting respectively on the friction members, and an actuator mounted on said support and operating said levers in which actuating means said actuator is formed with a projecting boss, and the support is formed by a drawn sleeve seated upon said boss, and an anchor plate for said friction members is secured upon said sleeve by a fastening secured to the end of said boss.

4. Actuating means for a brake having friction members inclosed between a drum and a support, comprising a wheel cylinder actuator mounted on the support externally of the brake, a floating lever acted on by said actuator and applying brake-applying force to one of said members, and a lever mounted on a fixed fulcrum and acting on the other friction member and connected to the floating lever to be operated thereby.

5. Actuating means for a brake having friction members inclosed between a drum and a support, comprising an actuator mounted on the support externally of the brake, a floating lever acted on by said actuator and applying brake-applying force to one of said members, and a lever mounted on a fixed fulcrum and acting on the other friction member and connected to the floating lever to be operated thereby.

6. A brake comprising, in combination with a drum, a support at the open side of the drum, a pair of shoes housed between the drum and support and which are individually shiftable to anchor at opposite ends in forward and reverse braking, a pair of wheel-cylinder actuating devices mounted on said support externally of the brake opposite the shoe ends, and a mechanical force-balancing device connected to be actuated by each wheel-cylinder device and passing through said support and acting on the adjacent ends of the shoes to apply balanced brake-applying thrusts thereto.

7. A brake having a supporting member and two friction members positioned on one side of the supporting member which are individually shiftable to anchor at opposite ends in forward and reverse braking, and which are operated by actuating means comprising a pair of levers passing through the supporting member and acting respectively on the friction members, a thrust link connecting the levers, and a hydraulic cylinder mounted on said supporting member on the side opposite the friction members and operating said levers.

8. A brake having a supporting member, a plurality of friction members positioned on one side of the supporting member, and means for actuating the friction members comprising a pair of levers passing through the supporting member and acting respectively on the friction members, a thrust link connecting the levers, and a hydraulic actuator mounted on said supporting member on the side opposite the friction members and operating said levers.

RUDOLPH A. GOEPFRICH.